US005903341A

United States Patent [19]

Perry et al.

[11] Patent Number: 5,903,341

[45] Date of Patent: May 11, 1999

[54] PRODUCE GRADING AND SORTING SYSTEM AND METHOD

[75] Inventors: John L. Perry, Herndon; Thomas D. Gamble, Annandale; David D. Doda, Burke, all of Va.

[73] Assignee: ENSCO, Inc., Springfield, Va.

[21] Appl. No.: 08/978,642

[22] Filed: Nov. 26, 1997

Related U.S. Application Data

[60] Provisional application No. 60/037,154, Dec. 6, 1996.

[51] Int. Cl.[6] ............................ G01N 21/00; B07C 5/00

[52] U.S. Cl. ............................ 356/237; 209/587; 348/91

[58] Field of Search .................................... 209/587, 939; 348/91; 356/237

[56] References Cited

U.S. PATENT DOCUMENTS

| | | | |
|---|---|---|---|
| 3,750,883 | 8/1973 | Irving et al. . | |
| 4,330,062 | 5/1982 | Conway et al. . | |
| 4,482,061 | 11/1984 | Leverett . | |
| 4,624,367 | 11/1986 | Shafer et al. | 209/577 |
| 5,024,047 | 6/1991 | Leverett . | |
| 5,090,576 | 2/1992 | Menten . | |
| 5,267,654 | 12/1993 | Leverett . | |
| 5,294,004 | 3/1994 | Leverett . | |
| 5,443,164 | 8/1995 | Walsh et al. | 209/580 |
| 5,526,119 | 6/1996 | Blit et al. | 356/402 |
| 5,538,142 | 7/1996 | Davis et al. | 209/580 |

*Primary Examiner*—Mark Hellner

*Attorney, Agent, or Firm*—Sixbey, Friedman, Leedom & Ferguson; Daniel W. Sixbey

[57] ABSTRACT

A method and apparatus for inspecting and sorting agricultural products which includes launching each product individually from an input transport unit with substantially no change in speed or direction across a gap to an output transport unit. Fixed line scan camera and photocell units are mounted at spaced intervals around the gap to simultaneously optically line scan in the same plane the surfaces of the product. A plurality of simultaneous line scans are sequentially taken at intervals timed to the speed of the input transport unit as the product travels across the gap, and data obtained from the sequential line scans is used to determine the size, shape, weight, color and other characteristics of the product. The product is graded based upon this characteristics and is sorted based upon its grade by a mechanical sorting unit.

36 Claims, 6 Drawing Sheets

PRODUCE GRADING AND SORTING SYSTEM AND METHOD

This application is a continuation in part of Provisional application Ser. No. 60/037,154 filed Dec. 6, 1996.

TECHNICAL FIELD

The present invention relates to produce grading and sorting units generally, and more particularly to a method and apparatus for noninvasively inspecting agricultural products by simultaneously sensing a plurality of product characteristics.

BACKGROUND OF THE INVENTION

In the past, the inspection and grading of produce was mainly a manual process which was both labor intensive and time consuming. Attempts to automate the process and alleviate the amount of handling and inaccuracy associated with the human sorting of produce, initially resulted in the use of mechanical sizing units which sorted produce by size, but which still required visual inspection by a human inspector. As automated produce grading technology developed, photosensitive units were provided to sense the color characteristics of produce items as illustrated by U.S. Pat. Nos. 3,750,883, 4,330,062 and 5,090,576. In addition to color sensing, various systems were developed for also sorting products by weight, as illustrated by U.S. Pat. Nos. 5,294,004, 5,267,654 and 4,482,061.

Where both color and weight sensing are involved in a produce sorting system, the problem has been to effectively transport the produce past color sensing stations which will sense all surfaces of each produce item and then to separately transport the produce over weight sensing assemblies to obtain an item by item weight indication. In the past, this operation has been performed by complex conveyor systems which are combined with individual produce item holding units to both transport and rotate each produce item inspected. This results in not only a relatively time consuming process, but also requires the use of complex machinery in prolonged physical contact with the produce items being graded.

In an attempt to eliminate apparatus for rotating an item during inspection, systems have been developed for dropping items from above onto a conveyor and scanning each item as it falls. These systems are not well suited for the inspection of agricultural products which can be bruised or injured upon impact. Also items tend to bounce when dropped from above making their final position on an output conveyor difficult to accurately ascertain, thereby making an item sorting operation difficult to accomplish.

DISCLOSURE OF THE INVENTION

It is a primary object of the present invention to provide a novel and improved method for inspecting the quality of agricultural products noninvasively while simultaneously sensing a plurality of product characteristics.

Another object of the present invention is to provide a novel and improved method for inspecting the quality of agricultural products and simultaneously obtaining data relating to a plurality of product characteristics while each product is travelling along a path through the air. Impact damage to the product is minimized by not substantially changing the speed or path of travel of the product as it enters and leaves a travel path through the air.

A further object of the present invention is to provide a novel and improved method for inspecting the quality of agricultural products by optically line scanning each product a plurality of times as it travels through the air. The product is scanned along lines which are transverse to its path of travel.

Yet another object of the present invention is to provide a novel and improved method for inspecting the quality of agricultural products by optically line scanning each product with a plurality of simultaneous line scans in substantially the same plane but on different surfaces of the product while the product is travelling through the air and sequentially taking a plurality of such simultaneous line scans to obtain data indicative of different characteristics of a product, and then comparing the data indicative of each product characteristic with a preset characteristic reference value for such product characteristic and using such comparisons to obtain a grade designation for the product.

A further object of the present invention is to provide a novel and improved produce grading and sorting system including an input transport unit spaced from an output transport unit to form an inspection gap therebetween. The input transport unit launches a produce item in a substantially horizontal path across a gap and a plurality of optical line scan units mounted around the gap simultaneously line scan the surfaces of the produce item in substantially the same plane and provide data to a central processor unit. A plurality of sequential simultaneous line scans are employed to obtain characteristic data for the complete produce item.

Another object of the present invention is to provide a novel and improved produce grading and sorting system which employs optical sensors configured in a unique arrangement around the gap between two produce conveyors to optically inspect a product item as it passes across the gap to obtain characteristic data indicative of features of a produce item. An operator is permitted to precisely define the grading criteria for the system by adjusting a set of thresholds and preset reference values in a central processor unit which receives the characteristic data and compares it with such thresholds and preset reference values to derive a grade designation for the produce item.

DESCRIPTION OF THE PREFERRED EMBODIMENT

Figure 1:
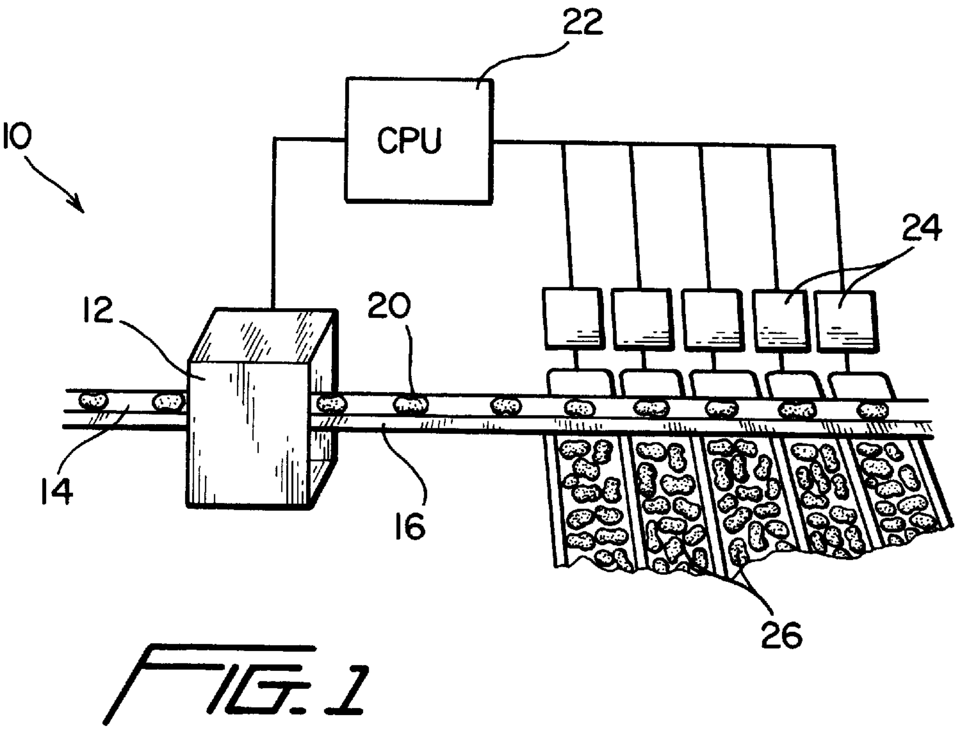
FIG. 1 is a diagram of the produce grading and sorting system of the present invention.
Figure 2:
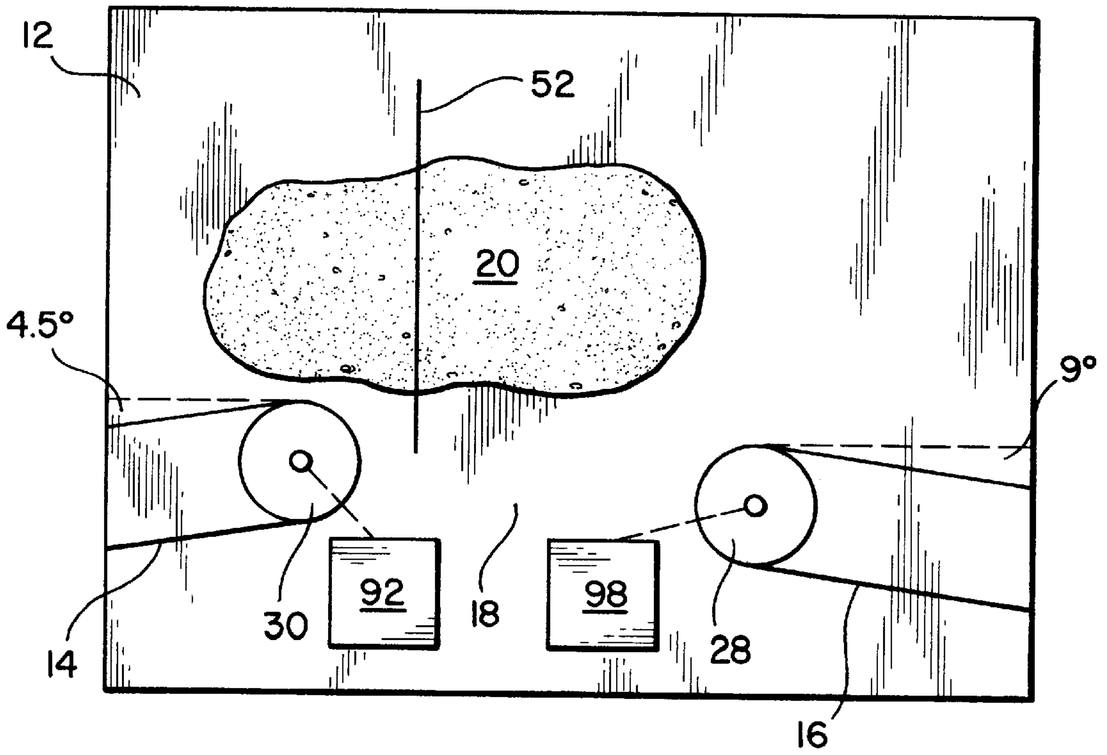
FIG. 2 is a diagram of the scanning enclosure for the produce grading and sorting system of FIG. 1.

Referring now to the drawings, the basic produce grading and sorting system of the present invention indicated generally at 10 includes a scanning enclosure 12 which is mounted to receive an input conveyor 14 and an output conveyor 16. A gap 18 is provided between the input conveyor and the output conveyor within the scanning enclosure. Produce items 20 to be graded and sorted are fed single file in spaced relationship into the scanning enclosure by the input conveyor which is travelling at a speed sufficient to launch each item of produce along a substantially horizontal path in the air across the gap 18 and onto the output conveyor 16. While travelling through the air, a 360 degree inspection of an item of produce is made in a manner to be described, and the data resulting from the inspection is sent to a central processor unit 22. For each produce item inspected, a record is kept in the central processor unit of the inspection results, and based upon the inspection data, control signals are sent to one of a plurality of mechanical kick-out sorters 24 causing the selected sorter to eject the produce item in one of a plurality of bins 26.

To properly launch a produce item 20 across the gap 18 from the input to the output conveyor, the relative end positions of the two conveyors on either side of the gap, the width of the gap, the relative angles of the two conveyors adjacent to the gap and the conveyor speeds all play a part. For example, if the produce item 20 is a potato, the gap 18 between the output spool 28 of the conveyor 14 and the input spool 30 of the conveyor 16 may be three inches. The input conveyor 14 is inclined downwardly away from the gap at an angle of the 4.5 degrees relative to the horizontal while the output conveyor 16 is inclined downwardly away from the gap at an angle of 9 degrees relative to the horizontal or twice the angle to the horizontal of the input conveyor. Also, the input spool 30 of the output conveyor is positioned slightly below the output spool 28 of the input conveyor. This permits the potato 20 to be launched from the input conveyor at a slight upward angle and to follow a curved trajectory without substantial spinning along a course of travel across the gap where it moves and angles downwardly to reach substantially the height and angle of the output conveyor so as to minimize the impact with the output conveyor.

The speed of the input conveyor, the output conveyor and the speed of travel of the potato 20 across the gap 18 should be substantially equal. It has been found that if the speed of the conveyors is sufficient to move a potato 20 at a velocity of 355 feet per minute, it will traverse the gap 18 (3 inch gap) in approximately 42 milliseconds. By launching an item of produce across a gap between two moving conveyors along a substantially horizontal path which conforms to the path of travel for the items on the conveyors, produce damaging impacts are minimized if all speeds are substantially equalized as described. Such produce damaging impacts are not avoided where a produce item is dropped downwardly through a gap, as speed and impact are not controllable.

Although the input conveyor 14 and the output conveyor 16 within the scanning enclosure 12 have been shown as an integral, unitary portion of external input and output conveyors, for some applications it is contemplated that the angled conveyors within the scanning enclosure will be separate conveyors mounted on the enclosure which are brought into juxtaposition with outside conveyors which convey produce to the enclosure and then to the bins 26. Also, although the angled conveyors 14 and 16 have been found to be an effective way to launch produce items across the gap 18 while minimizing impact to the item, it is contemplated that other structures to launch and/or receive the produce item, such as air or fluid conveying units might be employed.

Figure 3:
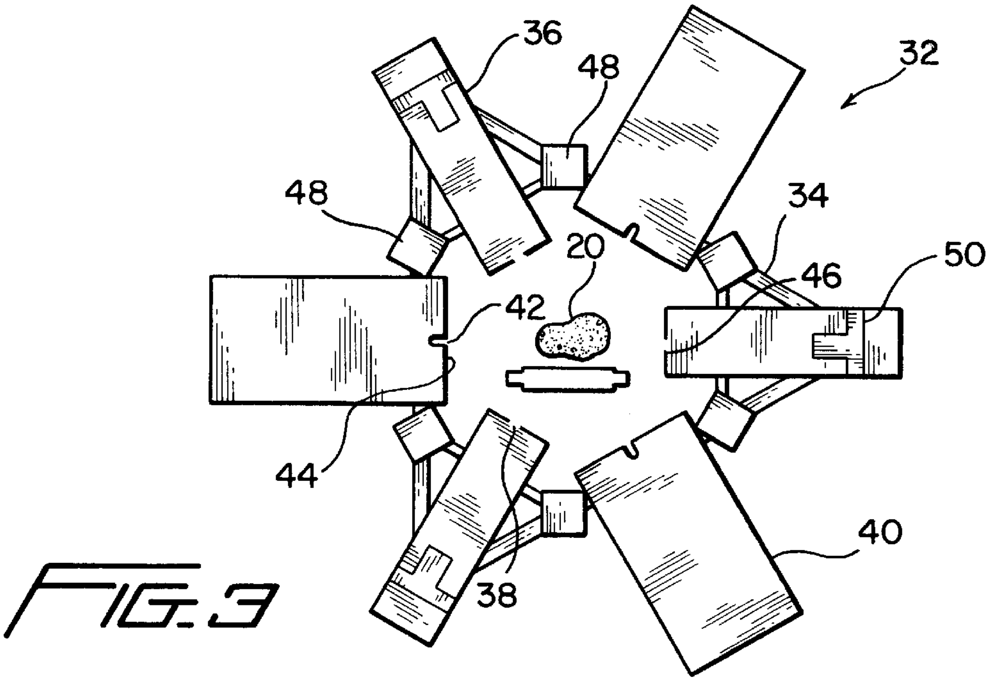
FIG. 3 is a diagram of the optical scanning assembly for the produce grading and sorting system of FIG. 1.
Figure 4:
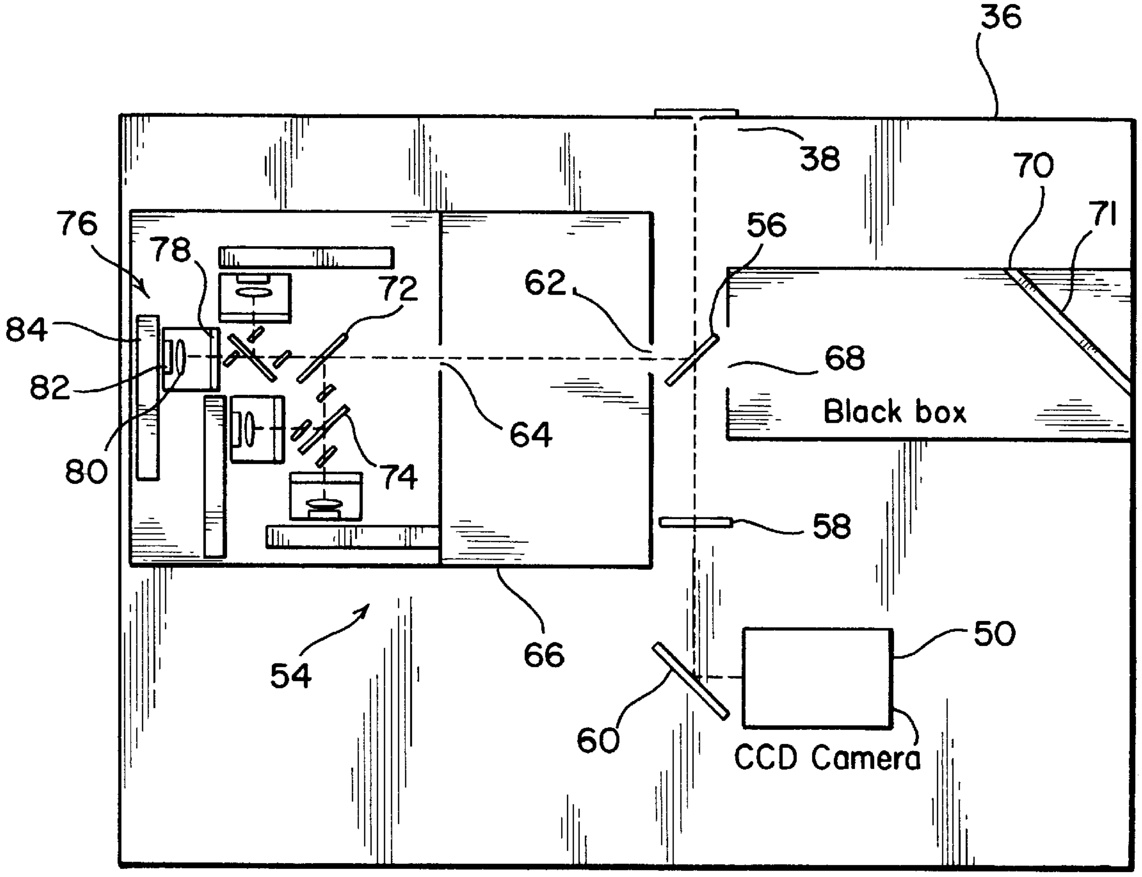
FIG. 4 is a diagram of a camera box for the optical scanning assembly of FIG. 3.

With reference to FIGS. 3 and 4, a unique scanning assembly indicated generally at 32 is used to scan the produce item 20 as it travels across the gap 18. This scanning assembly includes a frame 34 which is mounted on the interior of the scanning enclosure 12. This frame supports three camera boxes 36 in a circular configuration around the gap 18, with each camera box including a vertical scanning slit 38 positioned at a 120° point on the circle from the remaining two scanning slits. The trajectory of the produce item 20 across the gap is designed to pass substantially through the center of the circle.

Also mounted on the frame 34 on the same circle defined by the camera boxes 36 are three black boxes 40, each having a vertical input slit 42 positioned at a 120° point on the circle from the remaining two black box input slits. Each black box input slit is 180° from a camera box scanning slit so that every camera box scanning slit is aligned with an opposed black box input slit. The interior of the top, bottom, side and end walls of each black box are dark black in color as preferably also are the exterior surfaces of such walls. The exterior of the endwall 44 which contains the input slit 42 of each black box must be dark black in color, and this black box endwall extends parallel to the endwall 46 which contains the scanning slit 38 of the opposed camera box. The height and width of each black box end wall 44 is at least equal to, and is preferably greater than, the height and width of the opposed camera box end wall 46.

Mounted in equally spaced relationship on the frame 34 on opposite sides of each camera box 36 are two lights 48 which are inclined to direct a beam of light onto a produce item 20 as it moves across the gap 18. The camera box 36 between the two lights 48 houses a digital charge coupled device (CCD) line scan camera 50 focused through the scanning slit 38 to scan a scan line 52 in the area where the beams of the two side lights 48 are focused. Thus the produce item is subjected to simultaneous line scans which, due to the 120° spacing, of the scanning slits, scan a line around the entire surface of a produce item 20 moving across the gap 18. The scanning slits 38 are oriented so that the CCD line scan camera line scans are in substantially the same plane, and this plane is transverse to the travel trajectory of the produce item. Thus each simultaneous three line scans provide a scan of a narrow slice of the produce item.

In addition to the image produced by the line scan CCD cameras 50, which may be known commercial CCD cameras such as Dalsa digital line scan cameras, a produce item may be scanned through the scanning slit 38 for various color characteristics. Thus, each camera box 36 may include not only the CCD line scan camera 50, but also a photocell sensing array 54. The CCD camera receives a line scan from the scanning slit 38 via a pass through red reflector 56, an infrared reflective mirror 58 and an adjustable mirror 60. The red reflector directs the light reflected thereby from the scanning slit through a slit 62 and a slit 64 in a photocell enclosure 66. Aligned with the slit 62 is a slit 68 in a black box 70 which is constructed in the same manner as the black boxes 40. All such black boxes contain an angled baffle 71 adjacent to the rear wall thereof which has a glossy black surface, whereas the surfaces of the black boxes are flat black in color.

The light beam from the slit 64 is directed by a reflector 72 to an array of up to six beam splitters 74, two of which are shown in FIG. 4. The beam is split among up to six photocell assemblies 76, which each include a narrow band optical filter 78, a lens 80, a photocell sensor 82 and a preamplifier board 84 which amplifies the photocell output. Four photocell assemblies are shown in FIG. 4.

Figure 5:
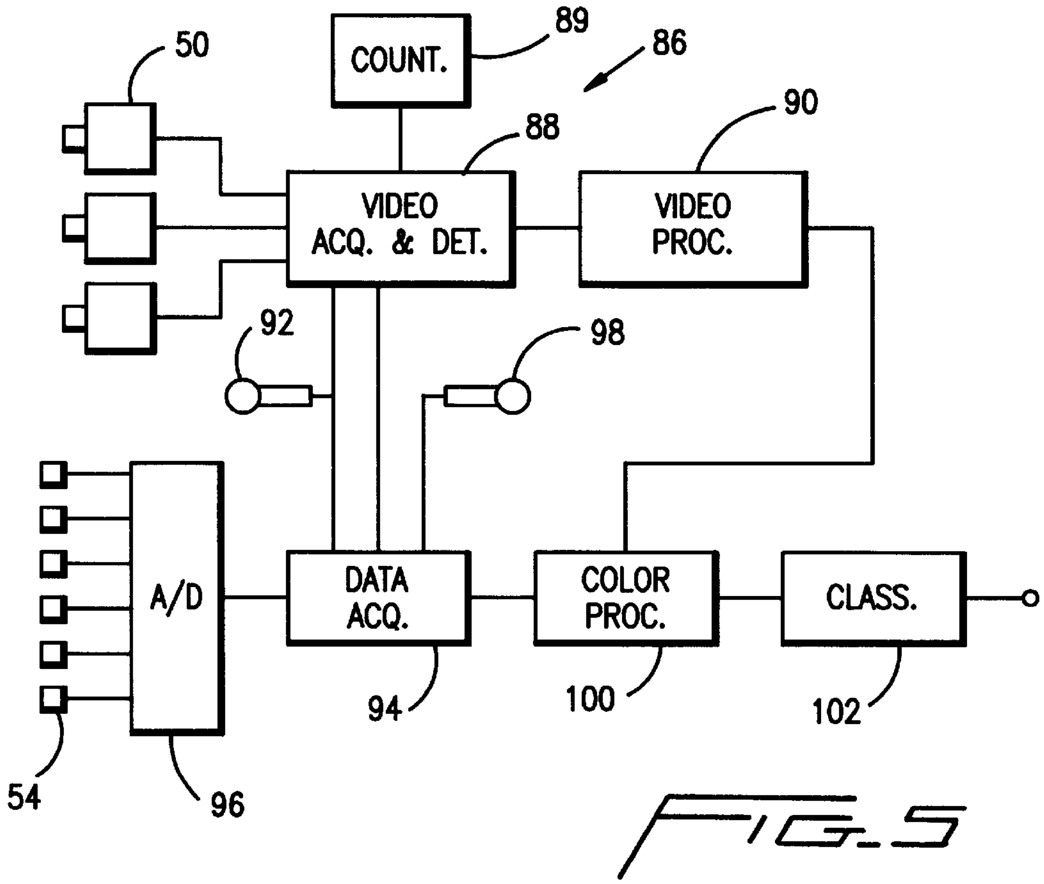
FIG. 5 is a diagram of the software system architecture for the central processor unit of FIG. 1.

Referring now to FIG. 5, the software system in the central processor unit 22 for processing the photocell and CCD camera video data acquired from the scanning assembly 32 is illustrated generally at 86. This system has processes that execute both in an I-860-based Digital Signal Processing Board and an Intel-80486-based Host computer. In the system 86, digital information will be captured from the three CCD cameras 50 spaced radially 120° apart by a video acquisition and detection software component 88. Each 32-bit word will contain one 8-bit pixel from each of the three cameras plus a fourth full byte, and each scan line consists of at least 256 pixels.

The purpose of the video acquisition and detection software component 88 is to acquire scan lines of video data from the line scan CCD cameras, detect the presence of an object, and to pass the scan lines that contain significant information to a video processing software component 90. At the rate of approximately once per millisecond, the video cameras are simultaneously triggered by a signal from a spaced sensor 92, such as a shaft encoder, which senses the speed of the input conveyor 14. The triggering is such that the belt travels a fixed distance between scan lines. When a set of scan lines has been received, the software component will process the input data to determine whether there is an object in the field-of-view for this set. If it is determined that an object is present, the data will be demultiplexed so that the data from each camera is contiguous. As the data is being demultiplexed, it is also corrected for the variation in the pixels in the cameras. This demultiplexed video data is transferred to the video processing software component 90. If an object is not detected in the scan lines, a notification is given to the video processing software component.

Each time a three line scan or scan set is received by the video acquisition and detection software component 88, a 32 bit unsigned counter 89 is incremented. The value count in this counter is used as an identifier for the scan set which creates the count value, with the CCD camera data and photocell data from each scan set being indicative of a slice taken in a plane through a produce item.

The video processing software component 90 accepts video data from the video acquisition and detection software component 88 and produces a preliminary object description vector. One preliminary object description vector will be produced for each series of scan line sets, provided that sufficiently many sets are in the series to indicate that a valid object is present. To whatever extent is practical, the video processing software component will process the scan line sets as they are received to minimize the processing required to complete a preliminary object description vector when an end of object is detected. As an example, the preliminary object description vector derived from the video data may include the following data elements:

1. Start Scanline
2. End Scanline
3. Size Value
4. Shape Quality Factor
5. Growth-crack Quality Factor
6. Bruise Quality Factor
7. Fresh-cut Quality Factor
8. Blight Quality Factor For each of the three views corresponding to the camera views, photocell readings will be obtained by a data acquisition software component 94 from an analog to digital converter 96 connected to receive the amplified outputs from each photocell array 54. These photocell readings are taken at the same rate and in synchronization with the CCD camera scan lines, and cover the same areas on the produce item 20 as they are taken through the same scanning slits 38. The photocells are used to detect color features such as green, blight and fresh cut defects.

The data acquisition software component 94 collects data from the photocells and any other analog or digital data required by the system. This software component will be divided into two sub-components, a device driver for the analog-to-digital converter 96 and an application level data processor. The A/D driver will accept, using direct memory access (DMA), sets of photocell readings into a ring of buffers with each buffer holding multiple sets. The sets will be produced at the same rate and in synchronization with the data from the cameras. The application level subcomponent will be notified each time a buffer has been filled. The application level subcomponent will correct the acquired data for variations in the sensitivity of the photocells and variations in the gains of their amplifiers. The data will be kept in a circular buffer of sufficient length to cope with any latency due to the processing. The data will be able to be retrieved from the buffer by a line scan set count. The application level subcomponent will also maintain data received from a shaft encoder 98 on the Output conveyor 16. This information will be kept so that inquiries may be made of the position of an object on the output conveyor based on the scan line position of the centroid of the object.

In addition, the application level subcomponent will continuously verify that the scan line set count in the video acquisition and detection software component is synchronized with the data acquisition count.

A green processing software component 100 accepts preliminary object description vectors from the video processing software component 90 and produces complete object description vectors for a classification software component 102. The mean value of the start and end scan line positions is used to get an output belt position from the data acquisition software component 94. The corrected photocell data corresponding to scan lines from the start scan line through the end scan line is used to produce a green quality score for the produce item 20. An example of the complete object description vector is as follows:

1. Object "Centroid" Output Position
2. Size Value
3. Shape Quality Factor
4. Growth-crack Quality Factor
5. Bruise Quality Factor
6. Fresh-cut Quality Factor
7. Blight Quality Factor
8. Green (Chlorophyll) Quality Factor The classification software component 102 produces an object classification as an output which is used by the CPU 22 to select and control a kick out sorter 24. The size parameter in the complete object description vector will be used for weight computation in a manner to be described, and this with parameters other than the centroid position will be used to determine the class of a produce item.

The produce grading and sorting system 10 has been tested using potatoes as the produce item 20. For potatoes, it is possible to detect knobs or bumps, quantitative deviation in shape from an ellipse, weight, size, blight, cracks or scrapes and other color variations.

For knob grading, the edge curvature K(s) of the potato is computed, where s is the scan line number. This is computed from U(s) and L(s), the upper and lower edges of the potato. The curvature depends on t, the thickness of a slice, the distance between scans, in units of the distance between pixels along the scan.

The square of the curvature of the upper edge is, $$K_U{}^2=\frac{1024(t^2(4U(s)-2(U(s+2)+U(s-2))+U(s+1)+U(s-1)-U(s+3)-U(s-3)))^2}{((8t)^2+(U(s+2)-U(s-2)+2(U(s+1)-U(s-1))^2)^3}$$

and similarly for the lower edge.

The knob score is the number of times $K^2$ exceeds a threshold, either along the top or bottom of the potato, summed over all three views. The threshold is set experimentally.

The non-ellipticity of a potato is described by how much the second moments deviate from those of an ellipse with the same area and first moments of the potato.

Compute the following six parameters of the shape $$A=t\sum_s U(s)-L(s)$$

$$F_x=t^2\sum_s s(U(s)-L(s))$$

$$F_y=\frac{t}{2}\sum_s (U(s))^2-(L(s))^2$$

$$S_x=t^3\sum_s s^2(U(s)-L(s))$$

$$S_y=\frac{t}{3}\sum_s (U(s))^3-(L(s))^3$$

$$S_{xy}=\frac{t^2}{2}\sum_s s((U(s))^2-(L(s))^2)$$

The distance of the centroid from the first scan line is, $$C=\frac{F_x}{tA}$$

The average of these distances from the three views will be used to define the center of the potato for kicking.

The second order invariant moments of the potato are:

$$M_{xx}=S_x-\frac{F_x{}^2}{A}$$

$$M_{yy}=S_y-\frac{F_y{}^2}{A}$$

and $$M_{xy}=S_{xy}-\frac{F_xF_y}{A}$$

If the figure were rotated by an angle, $$\theta=\frac{1}{2}\arctan\frac{2M_{xy}}{M_{yy}-M_{xx}}$$

then $M_{xy}$ would be zero. If the figure were actually an ellipse, this would align the axes of the ellipse with the coordinate axes. The arctan function will define an angle between +90° and −90°. Dividing by 2 then defines an angle between +45° and −45°. The second order invariant moments aligned with the coordinate axes are then $$M_a=M_{xx}\cos^2\theta+M_{yy}\sin^2\theta-2M_{xy}\sin\theta\cos\theta$$

and, $$M_b=M_{xx}\sin^2\theta+M_{yy}\cos^2\theta+2M_{xy}\sin\theta\cos\theta$$

If the potato were actually an ellipse with semi major and semiminor axes of a and b, then the quantity $$\frac{\sqrt{M_aM_b}}{A^2}\text{ will equal }\frac{1}{4\pi}.$$

For any figure other than an ellipse, the second moments for a given area will be larger. Thus the measure of the nonellipticity is, $$E=1000\left(\frac{\sqrt{M_aM_b}}{A^2}-\frac{1}{4\pi}\right)$$

and E will equal 0 only for a perfect ellipse.

The texture feature measures changes in intensity of the potato over distances of about 1 to 4 mm, 0.04 to 0.16 inches. It is sensitive to small spots of blight, bruises, growth cracks that have caused a change in surface color, or any other brightness variations on this scale.

Along each scan line, from five pixels above the lower edge of the potato to five pixels below the top edge of the potato, the intensities are summed over blocks of 4 pixels. The absolute value of the second derivative is computed, D(i)=2I(i)−I(i)−1)−I(i+1). D is averaged over blocks of six scan lines, overlapping by 3. The maximum value of the block average from any block from any view, multiplied by 30, is the texture score.

The growth crack algorithm detects collinear or almost collinear edges in the image. The collinear sets of feature points computed on the absolute values of the second derivative of the image are detected by mapping these pixels into a parameter space defined on a grid structure. Either overlapping or non-overlapping patches can be used. The collinear sets of pixels in the image are indicated by maxima in the parameter space. The valid angular range of linear cracks are defined prior to implementation.

Spectra were obtained from normal potatoes and from spots on potatoes which were judged to be purely blight, green, and fresh cut. The average value of the following spectral ratios, relative to the ratios of the normal potatoes, were determined for each type of flaw.

| | Fresh cut(W) | Green(G) | Blight(B) |
|---|---|---|---|
| R(1) = 600 nm/760 nm | 1.77 | .75 | .88 |
| R(2) = 760/670 | .62 | 1.73 | 1.14 |
| R(3) = 940/760 | .71 | 1.08 | 1.64 |

Under the assumption that combinations of defects would produce linear combination of deviations from the normal spectral ratios, any set of spectral ratios could be explained as the following severities of the three kinds of defects:

$$\begin{pmatrix}W\\G\\B\end{pmatrix}=\begin{pmatrix}.77&-.25&-.12\\-.38&.73&.14\\-.29&.08&.64\end{pmatrix}^{-1}\begin{pmatrix}R(1)-1\\R(2)-1\\R(3)-1\end{pmatrix}=$$

$$1.65\begin{pmatrix}1.00&.44&.39\\.33&1.00&0.00\\.12&-.13&1.00\end{pmatrix}\begin{pmatrix}R(1)-1\\R(2)-1\\R(3)-1\end{pmatrix}$$

It is necessary to specify the spectral ratios for normal potatoes. The absolute intensities are irrelevant. Even the ratios can be accurately measured only relative to some reference. The reference used is a color calibration object made of polyoynlchloride (PVC). Relative to the color calibration object, the relative intensities of normal potatoes were estimated to be:

| wavelength | 600 nm | 670 | 760 | 940 |
|---|---|---|---|---|
| N(1) | .61 | .70 | 1 | 1 |

Average intensities, I, are computed over 10 line blocks, (0.7 inches), overlapped by 50%. In every measurement of intensity, the background level is subtracted and the photocell output is divided by its value for the calibration object to correct for light feedthrough, offset voltages, and differences in optical alignment and electrical gain. Within each block, the normalized spectral ratios are computed. For example:

$$R(1) = \frac{I(600)N(760)}{N(600)I(760)}$$

Then the values of W, G, and B are computed. Typical ranges of values are about 0 to 0.5. Thus the W, G, and B values are multiplied by 200 to obtain the fresh cut, green, and blight scores, respectively. The maximum values for any block from any camera are found and compared to the specified thresholds. In addition, the average of the green scores is computed over the length of the potato for each camera view. The maximum of the three is the "Average Green" score.

The shape examination of the defect grading operation provides an accurate measurement of the potato volume. For each section of potato, the diameter is measured from three angles. Let the diameters from these three views for section s be $D_{1s}$, $D_{2s}$, and $D_{3s}$. Assume that the diameter changes continuously from each value to the next, that is, $$D(\theta) = D_1 + \frac{D_2 - D_1}{\frac{\pi}{3}}\theta, \qquad 0 < \theta < \frac{\pi}{3}$$

Then the area of potato between two lines differing by dθ would be $$dA = \frac{D^2}{4}d\theta$$

the area between the $D_1$ and $D_2$ profiles would be $$\Delta A = \frac{1}{4}\int_0^{\frac{\Pi}{3}} D_1{}^2 + \frac{6D_1(D_2 - D_1)}{\pi}\theta + \left(\frac{3(D_2 - D_1)}{\pi}\right)^2 \theta^2 d\theta$$

and the total area would be, $$A_s = \frac{\pi}{18}\left(D_1{}^2 + D_2{}^2 + D_3{}^2 + \frac{1}{2}(D_1D_2 + D_3D_2 + D_1D_3)\right)$$

The volume of the potato is just the sum of the areas, where t is the distance between slices.

$$V = t\sum_s A_s$$

The length of the potato is computed as simply the number of scan lines.

Assuming that the potatoes have uniform density, this also determines the weight. The density can be determined most accurately by measuring the specific gravity, the density relative to water. This can be measured by weighing a reasonable sample of potatoes, maybe 3 or 4, in air, $W_A$ and in water, $W_W$. Then the average specific gravity g is $$g = \frac{W_A}{W_A - W_W}$$

Note that the volume does not have to be measured directly and any scale factor cancels out. This should be accurate to 0.1% if the potatoes and water are the same temperature. The density of water is 0.998 g/cc at 20° C., decreasing by about 0.0002/C°.

Figure 7:
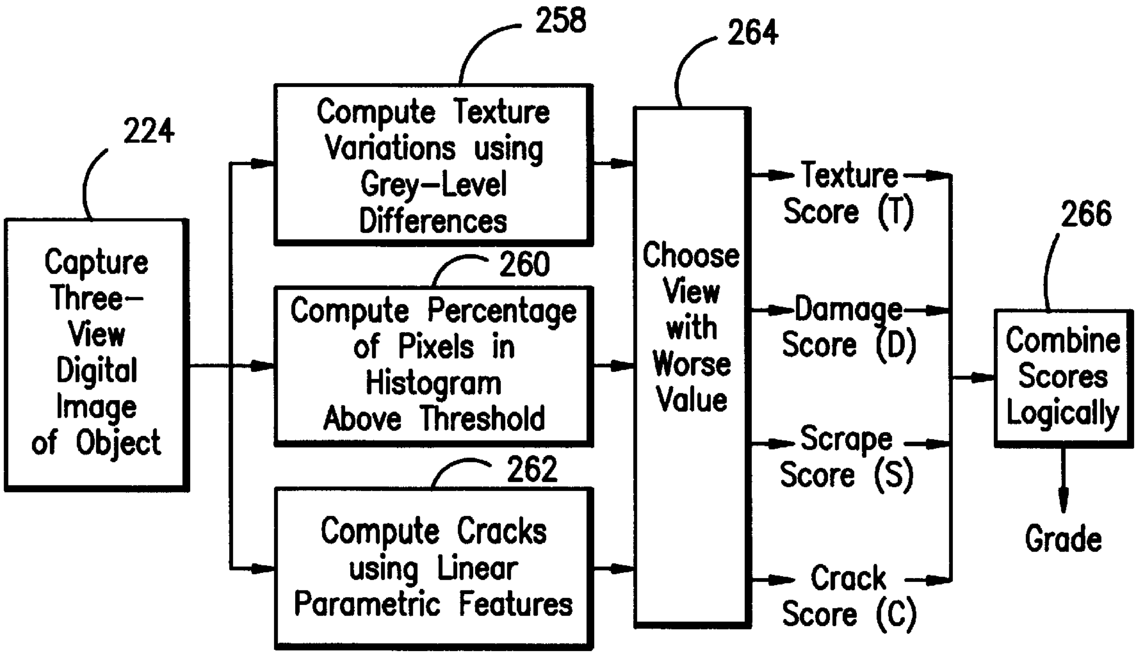
FIG. 7 is a flow diagram showing the external score grading computation provided by the software system of FIG. 5.
Figure 8:
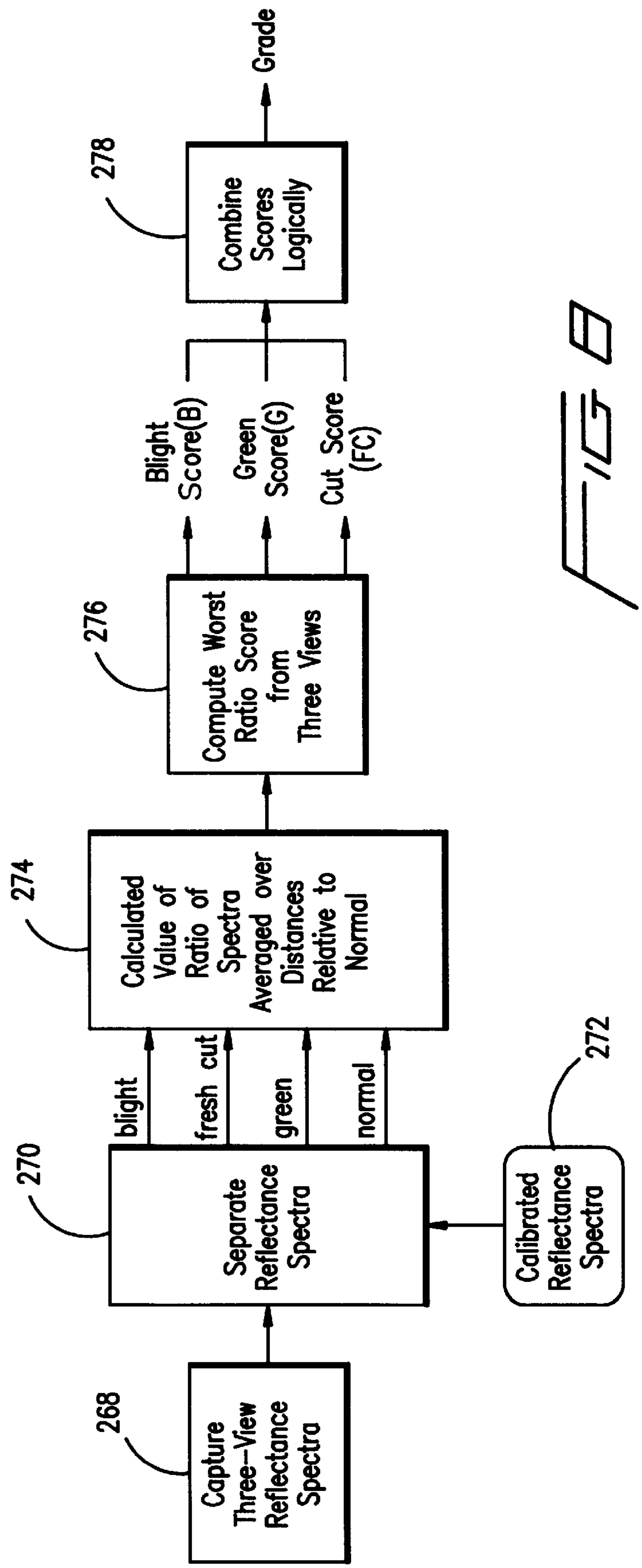
FIG. 8 is a flow diagram showing the color score grading computation provided by the software system of FIG. 5.
Figure 9:
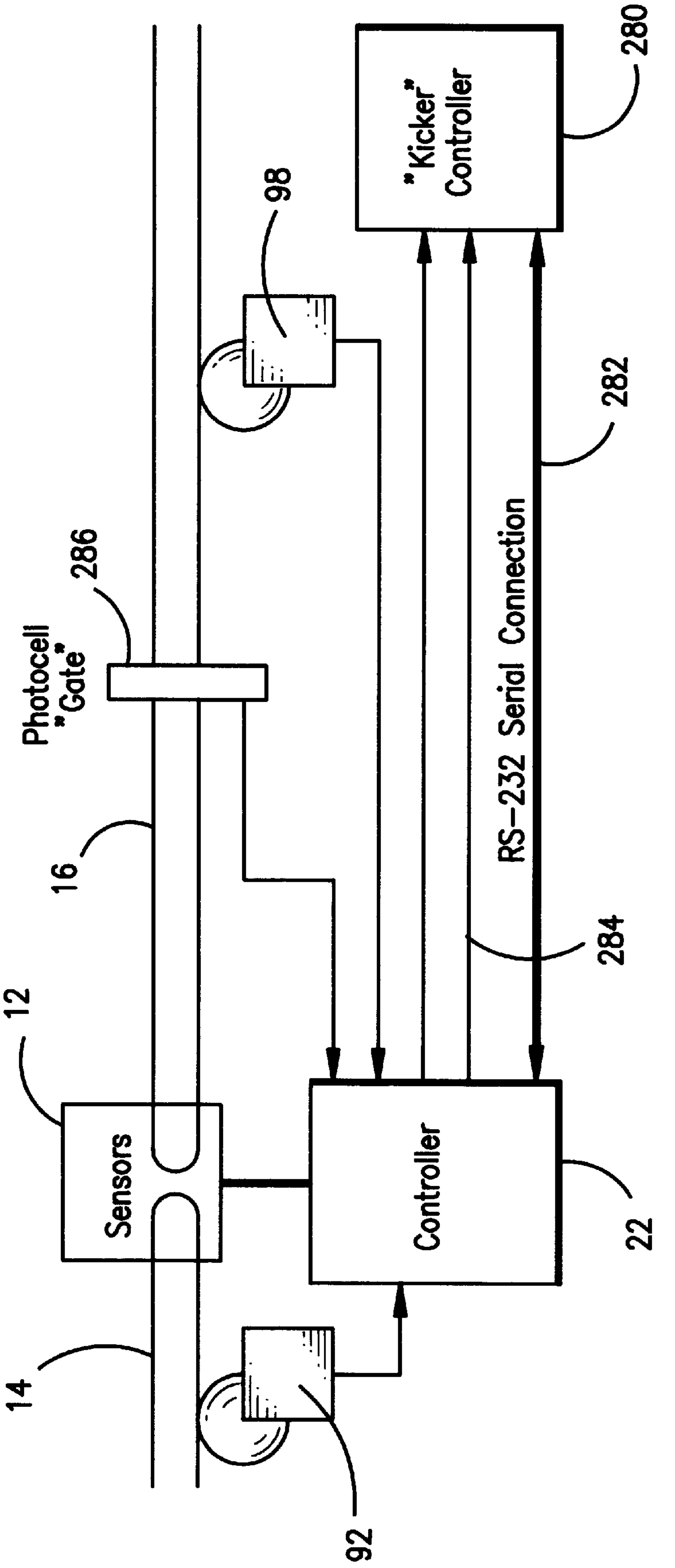
FIG. 9 is a block diagram of the kickout sorter control system for the produce grading and sorting system of the present invention.

The central processor unit 22 is programmed, once the digital image of an object, such as a potato, is captured from the line scan cameras 50 and the reflectance spectra of the object is captured from the photocell array 54, to make the computations indicated by the preceding equations to provide scores for color grading (FIG. 6), external grading (FIG. 7), and size, shape and weight grading (FIG. 8). The scores obtained from this calculation are then compared with preset reference values for each characteristic, and based upon this comparison, the product will receive a grade identification. This grade identification is provided to control a specific kick-out sorter 24 so that the product will be discharged into a bin 26 with products of like grade. The grading criteria for a product may be altered if an operator so desires by having the operator change the preset reference value for a characteristic which is preset into the central processor unit.

Figure 6:
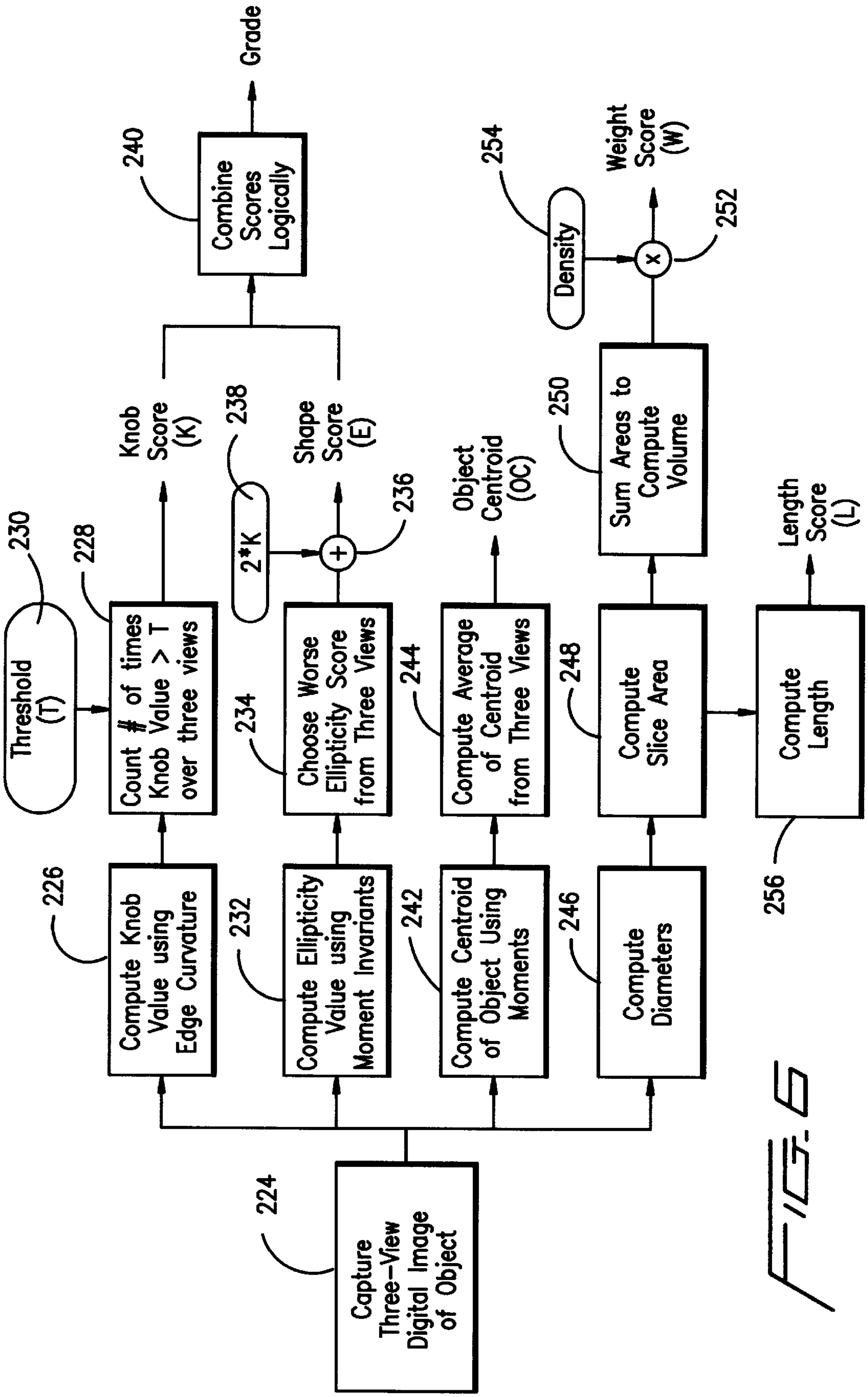
FIG. 6 is a flow diagram showing the size, shape and weight grading score computation provided by the software system of FIG. 5.

Referring to FIG. 6, the central processor 22 is programmed to receive the three view digital image of an object at 224 and to compute the knob value at 226 by computing the edge curvature and then determining at 228 the number of times the edge curvature K2 exceeds a threshold value T provided at 230 over all three views. From this computation, a knob score K is obtained.

Also from the three view digital image, an ellipiticity value or score for the three views will be computed at 232 using moment invariants and the worst ellipticity score will be selected at 234. This is summed at 236 with a reference from 238 to obtain a shape score E. The knob score K and the shape score E are combined at 240 to obtain a grade value.

To aid in locating the object on the output conveyor and in kicking the object from the conveyor, the three view digital image is used at 242 to compute the centroid of the object for each view, and the average of the centroid from the three views is computed at 244 to obtain the object centroid OC.

Finally, using the three view digital image, the diameters of the object are computed at 246 and the slice area is then computed at 248. The slice areas are summed at 250 to compute the volume of the object which is then multiplied at 252 by a density reference from 254 to obtain a weight score W. The summed slice areas also provide a length L at 256.

Turning now to FIG. 7, the three view digital image from 224 is used at 258 to compute texture variations using grey level differences and at 260 to compute the percentage of pixels in the histogram above a preset threshold value. At 262, the three view digital image is used to compute cracks using linear parametric features.

The values for each view computed at 258, 260 and 262 are analyzed at 264 and the view with the worst value is chosen to provide a texture score T, a damage score D, a scrape score S and a crack score C, all of which are combined at 266 to compute an external grade score.

An object color grade is computed as shown in FIG. 8 from three-view reflectance spectra data obtained from the photocell array 54 at 268. This three view reflectance spectra is separated at 270 and provided with calibrated reflectance spectra values from 272 to 274, where the ratio value of spectra averaged over object distances relative to normal is calculated for all three views. Then the worst ratio score from the three views is computed at 276 to obtain a blight score B, a green score G and a cut score FC. These scores are combined at 278 to obtain a color grade.

Once the object description vectors have been obtained, the object classification software 102 produces an object classification output which is transmitted as control data over an RS-232 serial connection from the central processor unit 22 to a kicker controller 280 for kickout sorters 24. The kicker controller receives messages from the central processor unit 22 and at the appropriate time, activates an appropriate mechanical kickout sorter 24. This is done by closing selected solid state relays for intervals that cause activation of the selected kickout sorter. The central processor unit not only provides the product classification information on the RS 232 serial line 282 to cause the kicker controller to select the proper kickout sorter, but also provides a photocell gate signal on a line 284 to indicate that an item on the output conveyor 16 has passed a photocell sensor 286. This photocell sensor is spaced a sufficient distance from the scanning enclosure 12 to permit the central processing unit time to compute an object classification output for a scanned item before the time that the item reaches the photocell sensor on the output conveyor 16. Once the photocell sensor 286 indicates that an item has reached the sensor, then the central processor unit provides position information on a line 288 on the basis of speed data provided by the shaft encoder 98. This position information relates to the actual position of a classified item approaching the kickout sorters and tells the kickout controller when to activate a designated kickout sorter.

We claim:

1. A method for inspecting the quality of agricultural products by individually inspecting each agricultural item in an inspection station which includes:

delivering each agricultural item to the inspection station along an input travel path at an input speed;

launching each agricultural item travel through the air in the inspection station along a course of travel and at a speed which is substantially the same as that of said input travel path and input speed; and optically line scanning the agricultural item a plurality of times during its travel through the air along the course of travel at a scan rate timed to the speed of travel of said agricultural item through the air to obtain scan line data indicative of characteristics of said agricultural item along each scan line, and processing all scan line data obtained from an agricultural item to obtain data signals indicative of characteristics of the complete agricultural item.

2. The method of claim 1 which includes scanning said agricultural item with CCD line scan cameras positioned at 120 degree intervals around the course of travel of the agricultural item through the air.

3. The method of claim 1 which includes timing the scan rate of said line scan cameras relative to the speed of travel of said agricultural item through the air.

4. The method of claim 3 which includes line scanning said agricultural item with photocells in synchronization with said CCD camera line scans to obtain optical data indicative of color characteristics of said agricultural item.

5. The method of claim 1 which includes processing line scan data from said CCD line scan cameras to obtain data indicative of the size of said agricultural item.

6. The method of claim 1 which includes processing line scan data from said CCD line scan cameras to obtain data indicative of the shape of said agricultural item.

7. The method of claim 5 which includes processing line scan data from said CCD line scan cameras to obtain data indicative of the weight of said agricultural item.

8. A method for inspecting the quality of agricultural products by individually inspecting each agricultural item in an inspection station which includes:

transporting each said agricultural item into the inspection station at an input transport speed along an input travel path;

launching each said agricultural item to travel through the air in the inspection station along a course of travel and at a speed which is substantially the same as that of said input travel path and input transport speed;

optically line scanning each agricultural item with a plurality of simultaneous line scans in substantially the same plane but on different surfaces of said agricultural item while the agricultural item is in the air;

sequentially taking a plurality of such simultaneous line scans as said agricultural item travels through the air along said course of travel and timing said plurality of sequential simultaneous line scans relative to said input transport speed to obtain line scan data indicative of characteristics of said agricultural item along each scan line;

receiving said agricultural item from the air while maintaining the speed thereof; and processing all scan line data obtained from an agricultural item to obtain data signals indicative of characteristics of the complete agricultural item.

9. The method of claim 8 which includes scanning said agricultural item with CCD line scan cameras positioned at 120 degree intervals around the course of travel of the agricultural item through the air.

10. The method of claim 8 which includes line scanning said agricultural item with photocells in synchronization with said CCD camera line scans and in the same plane as said CCD camera line scans to obtain optical data indicative of color characteristics of said agricultural item.

11. The method of claim 10 which includes triggering said CCD line scan cameras in timed relationship to said input transport speed along an input travel path.

12. A method for inspecting the quality of agricultural products by individually inspecting each agricultural item in an inspection station which includes:

delivering each agricultural item to the inspection station along an input travel path at an input speed;

launching each agricultural item through the air in the inspection station along a course of travel and at a speed which is substantially the same as that of said input travel path and input speed; and optically scanning the agricultural item as it travels through the air along the course of travel to obtain optical data signals indicative of characteristics of the agricultural item.

13. A produce grading system comprising:

an input transport unit having an exit end for conveying a produce item in a travel path and at an input transport speed sufficient to launch said produce item in substantially a horizontal path of travel outwardly from said exit end, an output transport unit having an input end spaced from the output end of said input transport unit to provide a small gap therebetween across which said produce item travels, said gap being dimensioned so that said produce item travels across said gap at a speed equal to said input transport speed and in substantially a horizontal travel path, a plurality of digital CCD line scan cameras mounted at spaced intervals around said gap to sequentially scan simultaneously in the same plane different surfaces of said produce item as it travels across said gap to provide scan data signals indicative of characteristics of said produce item, mounting means to mount said line scan cameras to scan in the same plane, and a processing and control unit connected to said digital CCD line scan cameras to receive said scan data signals.

14. The produce grading system of claim 13 wherein said input transport unit includes an input conveyor which includes an input conveyor exit end at a first side of said gap and said output transport unit includes an output conveyor aligned with said input conveyor which includes an output conveyor input end at a second side of said gap, said input and output conveyors being angled downwardly away from said input conveyor exit end and output conveyor input end respectively.

15. The produce grading system of claim 13 wherein said plurality of digital CCD line scan cameras are mounted by said mounting means to each scan a scan line along a separate surface of said produce item, said scan lines being in a plane transversely oriented relative to the horizontal path of travel of said produce item across the gap.

16. The produce grading system of claim 15 wherein said processing and control unit operates to trigger said digital CCD line scan cameras to cause said CCD line scan cameras to each simultaneously complete a line scan.

17. The produce grading system of claim 16 which includes a plurality of photocell units mounted at spaced intervals around said gap to sense the color of different surfaces of said agricultural item as it travels across said gap, said photocell units being connected to said processing and control unit and operating to provide color data signals indicative of color thereto.

18. The produce grading system of claim 17 wherein said processing and control unit operates to receive color data signals from said photocell units simultaneously with said scan data signals.

19. The produce grading system of claim 18 wherein each said digital CCD line scan camera is mounted in a camera enclosure supported by said mounting means, said camera enclosure having an enclosure end wall including a scanning slit through which said digital CCD line scan camera is focused, each said camera enclosure including photocell units mounted therein which sense color through said scanning slits.

20. The produce grading system of claim 19 which includes a light source mounted on said mounting means on opposite sides of each said camera enclosure, each such light source being mounted to direct a beam of light onto the area of said produce item which is scanned by the digital CCD line scan camera in said camera enclosure.

21. The produce grading system of claim 20 which includes a black box mounted on said mounting means opposite to each of said camera enclosures, each such black box having a box end wall which is substantially parallel to an enclosure endwall.

22. The produce grading system of claim 21 wherein said black box includes an input slit formed in said box endwall which is opposite to and substantially aligned with a scanning slit in a camera enclosure.

23. The produce grading system of claim 13 wherein said processing and control unit operates to trigger said digital CCD line scan cameras to cause said CCD line scan cameras to simultaneously complete a plurality of sequential line scans as said produce item moves across said gap, and a speed sensing unit connected to said processing control unit, said speed sensing unit operating to sense the speed of said input transport unit and to provide a speed indication to said processing and control unit, said processing and control unit operating to sequentially trigger said digital CCD line cameras at a rate dependent upon the speed of said input transport unit.

24. The produce grading system of claim 23 wherein each said digital CCD line camera is mounted in a separate camera enclosure supported by said mounting means, said camera enclosure having an enclosure end wall including a scanning slit oriented to extend transversely relative to the direction of the travel path of said produce item across said gap through which said digital CCD line scan camera is focused, each said camera enclosure including photocell units mounted therein to sense color through said scanning slit.

25. The produce grading system of claim 24 which includes a light source mounted on said mounting means on opposite sides of each said camera enclosure, each such light source being mounted to direct a beam of light onto the area of said produce item which is scanned by the digital CCD line scan camera in said camera enclosure.

26. The produce grading system of claim 25 which includes a plurality of black boxes mounted on said mounting means, each black box being mounted opposite to one of said camera enclosures, each such black box having a box end wall which is substantially parallel to the opposed camera enclosure end wall.

27. The produce grading system of claim 26 wherein said black box includes an input slit formed in said box endwall which is opposite to and substantially aligned with a scanning slit in the opposed camera enclosure.

28. The produce grading system of claim 13 wherein said processing and control unit includes processor means operative to classify each produce item based upon the scan data signals received therefor and a sorter unit is connected for operation by said processing and control unit to sort said produce items in accordance with the classification thereof by said processor means.

29. The produce grading system of claim 28 which includes an output transport speed sensing unit mounted on said output transport unit for sensing the speed of said output transport unit, a produce item position sensing unit mounted in spaced relationship to said output transport unit input end to sense the passage of a produce item on said output transport unit, said output transport speed sensing unit and produce item position sensing unit operating to provide speed and position signals to said processing and control unit, said processing and control unit operating to locate the position of a classified produce item on said output transport unit.

30. The method of claim 1 which includes receiving said agricultural item from the air and continuing movement of said agricultural item along an output travel path aligned with said course of travel and at a speed equal to said input speed;

classifying each such agricultural item based upon said optical data signals;

and sorting the agricultural items in accordance with the classification thereof.

31. The method of claim 30 which includes simultaneously and sequentially line scanning said agricultural item with a plurality of spaced CCD line scan cameras positioned around the course of travel of the agricultural item through the air to obtain line scans in the same plane simultaneously from the spaced line scan cameras, and line scanning said agricultural item with photocells in the same plane and in synchronization with said CCD camera line scans to obtain optical data indicative of color characteristics of said agricultural item.

32. The method of claim 31 which includes processing line scan data from said CCD line scan cameras to obtain data indicative of the shape of said agricultural item.

33. The method of claim 31 which includes processing line scan data from said CCD line scan cameras to obtain data indicative of the weight of said agricultural item.

34. The method of claim 12 which includes simultaneously and sequentially line scanning said agricultural item with a plurality of spaced CCD line scan cameras positioned around the course of travel of the agricultural item through the air to obtain line scans in the same plane simultaneously from the spaced line scan cameras, and line scanning said agricultural item with photocells in the same plane and in synchronization with said CCD camera line scans to obtain optical data indicative of color characteristics of said agricultural item.

35. The method of claim 34 which includes processing line scan data from said CCD line scan cameras to obtain data indicative of the shape of said agricultural item.

36. The method of claim 35 which includes processing line scan data from said CCD line scan cameras to obtain data indicative of the weight of said agricultural item.

* * * * *